No. 862,708. PATENTED AUG. 6, 1907.
E. N. CAMP.
FERTILIZER DISTRIBUTER.
APPLICATION FILED MAY 21, 1907.

Witnesses

Inventor
Edmond N. Camp
By
Attorney

UNITED STATES PATENT OFFICE.

EDMOND N. CAMP, OF MORELAND, GEORGIA, ASSIGNOR OF ONE-THIRD TO CHARLES F. CAMP AND ONE-THIRD TO GEORGE WOOSTER, OF MORELAND, GEORGIA.

FERTILIZER-DISTRIBUTER.

No. 862,708.      Specification of Letters Patent.      Patented Aug. 6, 1907.

Application filed May 21, 1907. Serial No. 374,893.

*To all whom it may concern:*

Be it known that I, EDMOND N. CAMP, a citizen of the United States, residing at Moreland, in the county of Coweta and State of Georgia, have invented a certain new and useful Fertilizer-Distributer, of which the following is a specification, reference being had therein to the accompanying drawing.

This invention relates to fertilizer distributers, the object of the invention being to provide novel, simple and reliable means for thoroughly agitating the fertilizer and rendering it practicable to quickly and easily adjust the degree of agitation thereof so that, in connection with an adjustable slide or gate, the rapidity of flow or feed of the fertilizer from the machine may be regulated to a nicety without stopping the machine.

With the above and other objects in view, the nature of which will more fully appear as the description proceeds, the invention consists in the novel construction, combination and arrangement of parts as hereinafter described, illustrated and claimed.

Figure 1:
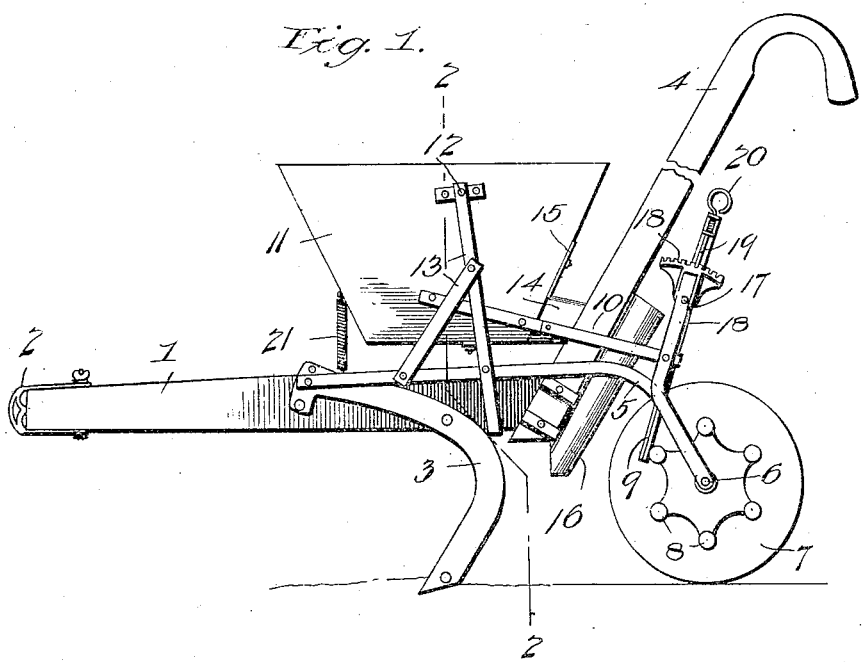
Figure 2:
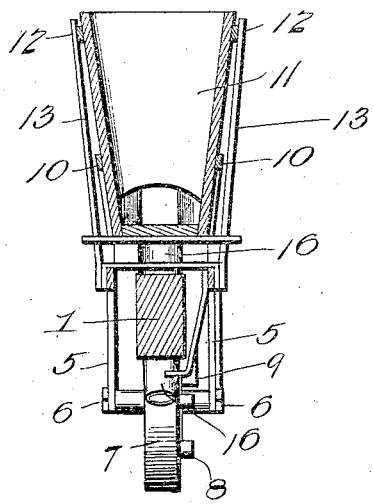
Figure 3:
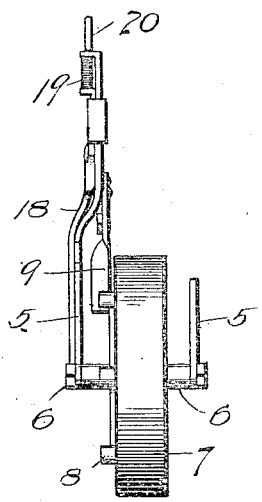

In the accompanying drawings:—Figure 1 is a side elevation of a fertilizer distributer embodying the present invention. Fig. 2 is a vertical cross section through the same on the line 2—2 of Fig. 1. Fig. 3 is also a cross section taken in line with the means for adjusting the degree of agitation and amount of vibration of the hopper.

Referring to the drawings, 1 designates the main beam of the machine, provided with the usual clevis 2 and having the foot or standard 3 secured thereto. To the rear end of the beam 1 are secured the handles 4, while secured to the beam and extending rearward along opposite sides of the same are fork arms 5, the rear portions of which are deflected downward and carry an axle 6 on which is mounted an agitator or operating wheel 7.

The wheel 7 is provided with a circular series of laterally projecting spurs 8, which as the wheel turns in rolling contact with the ground, strike successively against a knocker arm or lever 9. This knocker arm or lever 9 is operatively connected by means of a link 10 with an arm of the hopper 11 containing the fertilizing material, and as said hopper is fulcrumed near its upper end, at 12, on oppositely arranged stanchions 13, forming part of the rigid frame of the machine, oscillatory movement is thus imparted to the hopper as the wheel 7 revolves.

The hopper 11, is provided with a rearwardly projecting discharge spout 14, while at the junction of said spout with the body of the hopper, there is arranged a slide or gate 15 which controls the discharge opening of the hopper and regulates the amount of discharge of the material therefrom. The rear or delivery end of the spout 14 communicates with a downwardly extending boot 16 which receives the fertilizer and directs the same into the furrow or upon the ground.

In order to adjust and regulate the feed of material by the degree of agitation of the hopper, means are provided for setting the knocker arm or lever forward and backward and to this end, the said arm or lever is pivoted at 17 on an extension or arm 18 of the fork 5 or other convenient part of the machine frame. On the upper end of this arm or bracket 17 is a segmental rack 18 which is engaged by a spring pressed latch 19 working up and down in guides on the knocker arm and provided with an eye or handle 20 by means of which the latch may be disengaged from the segmental rack and the knocker arm or lever swung forward or backward as may be desired. By moving the handle 20 forward the degree of vibration of the hopper is increased and by moving said handle backward the degree of vibration of the hopper is decreased, as the lower end of the knocker arm or lever is moved more or less into the path or sweep of the spurs or projections 8 on the agitator wheel 7. The knocker arm is held toward the spurs 8 by a spring 21, interposed between the hopper and the beam 1 or other convenient part of the machine frame.

The mechanism above described is positive and reliable in operation and provides for regulating the discharge of the fertilizing material from the hopper; furthermore the mechanism described adapts the machine to fertilizers of all kinds in any condition, whether dry or moist and sticky, etc.

The forward ends of the fork arms 5 are pivotally connected to the beam 1, as shown in Fig. 1 to permit the wheel 7 to rise and fall relatively to the plow point, so that in case the plow point comes in contact with an obstruction and is thrown upward, the wheel 7 may continue along in contact with the ground and operate the fertilizer distributing mechanism without interruption.

I claim:—

1. A fertilizer distributer comprising a frame, a pivoted hopper, rearwardly extending fork arms pivotally connected at their forward ends with the frame, an agitator wheel mounted on the rear ends of said fork arms and having a series of projections, and means connected with the hopper and arranged in the path of said projections to be operated by the latter.

2. A fertilizer distributer comprising a pivoted hopper, an agitator wheel embodying a circular series of laterally projecting spurs, an angularly adjustable knocker arm pivoted on the machine frame and having a linked connection with the hopper and arranged in the sweep of the spurs, and a spring connected with the hopper and acting in opposition to the knocker arm.

3. A fertilizer distributer comprising a pivoted hopper, an agitator wheel having projections thereon, a knocker arm pivoted on the machine frame and arranged in the path of said projections and adapted to oscillate the hopper, and means for adjusting the angle of the knocker arm to give more or less throw thereto.

4. A fertilizer distributer comprising a pivoted hopper, an agitator wheel having a series of projections thereon, a pivoted knocker arm operatively connected with the hopper, and means including a hand-operated latch for setting the knocker arm to hold the same more or less in the path of said projections.

5. A fertilizer distributer comprising a pivoted hopper, an agitator wheel having a series of projections thereon, a pivoted knocker arm operatively connected with the hopper, and means including a latch and segment for setting the knocker arm to hold the same more or less in the path of said projections.

In testimony whereof I affix my signature in presence of two witnesses.

EDMOND N. CAMP.

Witnesses:
L. S. CHAMBLESS,
W. T. PITTS.